(12) United States Patent
Nelson et al.

(10) Patent No.: US 10,183,894 B2
(45) Date of Patent: Jan. 22, 2019

(54) AQUEOUS BRAZE PASTE

(71) Applicant: Rolls-Royce Corporation, Indianapolis, IN (US)

(72) Inventors: Scott Nelson, Carmel, IN (US); Sean E. Landwehr, Avon, IN (US); Joel Davis, Indianapolis, IN (US); Raymond Ruiwen Xu, Carmel, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 375 days.

(21) Appl. No.: 15/051,203

(22) Filed: Feb. 23, 2016

(65) Prior Publication Data

US 2016/0244374 A1 Aug. 25, 2016

Related U.S. Application Data

(60) Provisional application No. 62/119,611, filed on Feb. 23, 2015.

(51) Int. Cl.
*C04B 37/00* (2006.01)

(52) U.S. Cl.
CPC .......... *C04B 37/008* (2013.01); *C04B 37/006* (2013.01); *C04B 2237/128* (2013.01); *C04B 2237/385* (2013.01)

(58) Field of Classification Search
None
See application file for complete search history.

(56) References Cited

U.S. PATENT DOCUMENTS

| | | | |
|---|---|---|---|
| 3,171,734 A | | 3/1965 | Berson et al. |
| 3,309,239 A | * | 3/1967 | Harris ............... B23K 35/22 148/23 |
| 2010/0021716 A1 | | 1/2010 | Stock et al. |
| 2010/0075160 A1 | * | 3/2010 | Chaumat ............ B23K 1/0008 428/448 |
| 2013/0101429 A1 | | 4/2013 | Roussille et al. |
| 2013/0108422 A1 | | 5/2013 | Coupe et al. |
| 2013/0243604 A1 | | 9/2013 | Roussille et al. |
| 2014/0030076 A1 | | 1/2014 | Nunez et al. |

FOREIGN PATENT DOCUMENTS

EP 2236241 A1 10/2010

OTHER PUBLICATIONS

Singh et al. Robust Joining and Assembly Technologies for Ceramic Matrix Composites:Technical Challenges and Opportunities, Jan 1, 2002, p. 1-24.*

* cited by examiner

*Primary Examiner* — Robert T Butcher
(74) *Attorney, Agent, or Firm* — Shumaker & Sieffert, P.A.

(57) ABSTRACT

In some examples, a method including positioning a first ceramic or ceramic matrix composite (CMC) part and a second ceramic or CMC part adjacent to each other to define a joint between adjacent portions of the first ceramic or CMC part and the second ceramic or CMC part; and depositing an aqueous braze paste at least one of in the joint or adjacent the joint, wherein the aqueous braze paste comprises water, a water-soluble polymeric binder, and a silicon-based powder alloy.

20 Claims, 3 Drawing Sheets

AQUEOUS BRAZE PASTE

This application claims the benefit of U.S. Provisional Application No. 62/119,611, by Nelson et al., and filed Feb. 23, 2015, which is incorporated herein by reference in its entirety.

TECHNICAL FIELD

The present disclosure generally relates to brazes for joining ceramic or ceramic matrix composite components.

BACKGROUND

Some articles formed from ceramics or ceramic matrix composites (CMCs) are more easily formed out of multiple parts. For example the geometry of the article may be complex and may be difficult to form in a single piece. However, joining multiple parts formed of a ceramic or a CMC may be difficult, e.g., as the melting point of the ceramic or CMC may be very high, or the ceramic or CMC may decompose before melting.

SUMMARY

In some examples, the disclosure describes a method comprising positioning a first ceramic or ceramic matrix composite (CMC) part and a second ceramic or CMC part adjacent to each other to define a joint between adjacent portions of the first ceramic or CMC part and the second ceramic or CMC part; and depositing an aqueous braze paste at least one of in the joint or adjacent the joint, wherein the aqueous braze paste comprises water, a water-soluble alcohol based binder, and a silicon-based alloy powder.

In some examples, the disclosure describes an aqueous braze paste comprising water, a water-soluble polymeric binder, and a silicon-based alloy powder, wherein the braze paste is configured to connect a first ceramic or ceramic matrix composite (CMC) part and a second ceramic or CMC part adjacent to each other via a braze joint between adjacent portions of the first ceramic or CMC part and the second ceramic or CMC part.

In some examples, the disclosure describes an assembly comprising a first ceramic or ceramic matrix composite (CMC) part; a second ceramic or CMC part adjacent to the first ceramic or ceramic matrix composite part, wherein the parts define a joint between adjacent portions of the first ceramic or CMC part and the second ceramic or CMC part; and an aqueous braze paste at least one of in the joint or adjacent the joint, wherein the aqueous braze paste comprises water, a water-soluble alcohol based binder, and a silicon-based alloy powder.

The details of one or more examples are set forth in the accompanying drawings and the description below. Other features, objects, and advantages will be apparent from the description and drawings, and from the claims.

DETAILED DESCRIPTION

The disclosure describes assemblies, systems, and techniques for forming a joint between a first ceramic or CMC part and a second ceramic or CMC part using an aqueous braze paste. As described above, joining multiple parts formed of a ceramic or a CMC may be difficult, e.g., as the melting point of the ceramic or CMC may be very high, or the ceramic or CMC may decompose before melting. For ease of description, a ceramic or a CMC part may be referred to herein as a ceramic/CMC part. In some examples, a braze paste including a braze alloy and one or polymers may be used to form braze joint between two ceramic/CMC parts. However, residual polymers left on the surface of the joined parts after the burn-off portion of a braze cycle may adversely interact with the surface of the ceramic/CMC parts and/or braze alloy. Furthermore, some adhesives (e.g., super glue) which may be used to maintain a joint clearance between the two parts prior to brazing may also adversely interact with the surface of the ceramic/CMC parts and/or braze alloy.

In accordance with some examples of the disclosure, an aqueous braze paste may be used to form a braze joint between first and second ceramic/CMC parts to join the respective parts to each other. The aqueous braze paste may include a water-soluble polymeric binder, a silicon-based braze alloy powder (such as, e.g., Si—Ti or Si—Co), and water. The water-soluble polymeric binder may be chemically compatible with the composition of the first and second ceramic/CMC parts. For example, the combustion products of the alcohol based polymer will not react to form any detrimental phases within the structure of the first and second ceramic/CMC parts, nor does the aqueous braze paste react or degrade the first and second ceramic/CMC parts. Additionally, a water-soluble polymeric binder may be selected to function as an adhesive to temporarily bond the respective ceramic/CMC parts to each other in the proper position prior to brazing of the braze paste, e.g., to prevent movement of the parts relative to each other when the assembly is being transferred to a furnace for brazing. The water-soluble polymeric binder may function as such an adhesive mixed with the braze alloy powder and/or in its pure aqueous form at one or more surface interfaces between the respective parts. As one example, polyvinyl alcohol or other alcohol-based binder may be used as a water-soluble polymeric binder in the braze paste deposited adjacent to a joint between the respective SiC parts and also be used alone as an adhesive to bond the respective SiC parts in the desired position prior to brazing.

Figure 1A:
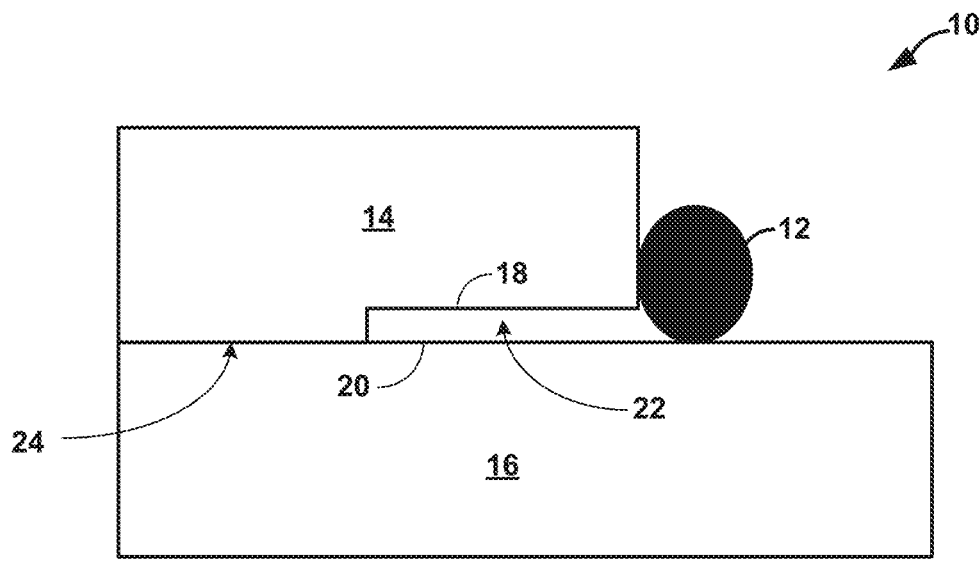
FIGS. 1A and 1B are a conceptual diagrams illustrating an example composite assembly including two ceramic/CMC parts before and after, respectively, being connected via a braze joint.
Figure 1B:
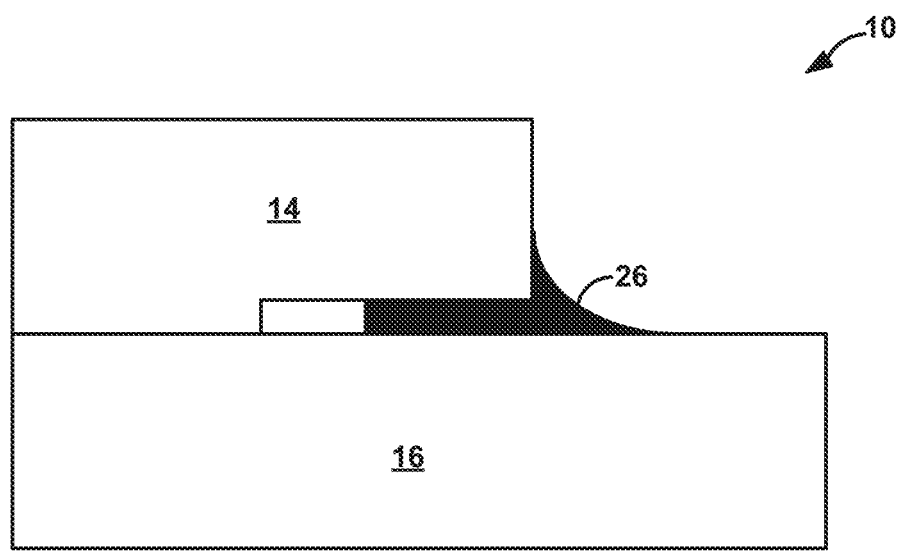

FIGS. 1A and 1B are a conceptual diagrams illustrating an example composite assembly 10 including first ceramic/CMC part 14 and second ceramic/CMC part 16 before and after, respectively, being connected by braze joint 26 using aqueous braze paste 12. First ceramic/CMC part 14 and second ceramic/CMC part 16 may be parts that form a component of a high temperature mechanical system. For example, first ceramic/CMC part 14 and second ceramic/CMC part 16 may together be a blade track, an airfoil, a blade, a combustion chamber liner, or the like, of a gas turbine engine. In some examples, first ceramic/CMC part 14 and second ceramic/CMC part 16 include a ceramic or a CMC that includes Si. In some examples, first ceramic or CMC part 14 and second ceramic or CMC part 16 may include a silicon-based material, such as silicon-based ceramic or a silicon-based CMC.

In some examples in which first ceramic/CMC part 14 and second ceramic/CMC part 16 include a ceramic, the ceramic may be substantially homogeneous. In some examples, first ceramic or CMC part 14 and second ceramic or CMC part 16 that includes a ceramic includes, for example, a Si-containing ceramic, such as $SiO_2$, silicon carbide (SiC) or silicon nitride ($Si_3N_4$); $Al_2O_3$; aluminosilicate (e.g., $Al_2SiO_5$); or the like.

In examples in which first ceramic/CMC part 14 and second ceramic/CMC part 16 include a CMC, first ceramic/CMC part 14 and second ceramic/CMC part 16 include a matrix material and a reinforcement material. The matrix material includes a ceramic material, such as, for example, SiC, $Si_3N_4$, $Al_2O_3$, aluminosilicate, $SiO_2$, or the like. The CMC further includes a continuous or discontinuous reinforcement material. For example, the reinforcement material may include discontinuous whiskers, platelets, or particulates. As other examples, the reinforcement material may include a continuous monofilament or multifilament weave. In some examples, the reinforcement material may include SiC, $Si_3N_4$, $Al_2O_3$, aluminosilicate, $SiO_2$, or the like. In some examples, first ceramic/CMC part 14 and second ceramic/CMC part 16 include a SiC—SiC ceramic matrix composite. In some examples, first ceramic/CMC part 14 and second ceramic/CMC part 16 may be formed of the same material (ceramic or CMC). In other examples, first ceramic/CMC part 14 may be formed of a different material than second ceramic/CMC part 16.

Although FIGS. 1A and 1B illustrates first ceramic/CMC part 14 and second ceramic/CMC part 16 as each defining a simple, substantially rectangular geometry, in other examples, first ceramic or CMC part 14, second ceramic or CMC part 16, or both may define a more complex geometry, including simple or complex curves, overhangs, undercuts, or the like.

First ceramic/CMC part 14 defines at least one joint surface 18. Similarly, second ceramic/CMC part 16 defines at least one joint surface 20. In some examples, joint surfaces 18 and 20 may define complementary shapes. FIG. 1 illustrates joint surfaces 18 and 20 as defining an overhang configuration. In other examples, joint surfaces 18 and 20 may define other shapes, including, for example, simple or complex curves, undercuts, or the like.

First ceramic or CMC part 14 and second ceramic or CMC part 16 are positioned such that joint surfaces 18 and 20 are adjacent to each other and define a joint or joint location 22. Joint or joint location 22 may be any kind of joint, including, for example, at least one of a bridle joint, a butt joint, a miter joint, a dado joint, a groove joint, a tongue and groove joint, a mortise and tenon joint, a birdsmouth joint, a halved joint, a biscuit joint, a lap joint, a double lap joint, a dovetail joint, or a splice joint. Consequently, joint surfaces 18 and 20 may have any corresponding geometries to define the surfaces of the joint 22. For example, for a mortise and tenon joint, first ceramic/CMC part 14 may define a mortise (a cavity) and second ceramic/CMC part 16 may define a tenon (a projection that inserts into the mortise). As another example, for a splice joint, first ceramic/CMC part 14 may define a half lap, a bevel lap, or the like, and second ceramic/CMC part 16 may define a complementary half lap bevel lap, or the like.

As show in FIG. 1, prior to brazing to join first part 14 and second part 16, aqueous brazing paste 12 may be deposited in and/or adjacent to joint 22 defined by surface portions 18 and 20. As described herein, aqueous brazing paste 12 may comprise water (e.g., distilled or deionized water), a water-soluble polymeric binder, and a silicon-based braze powder. Alternatively, aqueous brazing paste 12 may consist of water, a water-soluble polymeric binder, and a Si-based braze powder or consist essentially of water, a water-soluble polymeric binder, and a Si-based braze powder, where the braze paste function in the manner described herein.

Any suitable silicon-based alloy powder may be used. A silicon-based alloy powder includes a more silicon than any other single alloying component present. For example, in the case of a silicon-based alloy powder with silicon, Ti, and Zr in the composition, silicon would be present in a greater amount that the Ti individually and also in a greater amount that the Zr individually, while the combined total of Ti and Zr may or may not be greater than the amount of silicon. Example alloying components include Ti, Co, C, Mo, B, V, Cr, Cu, Nb, and Zr. Examples of a silicon-based alloy powder include Si—Ti, Si—Co, Si—Ti—C, and combinations thereof. In some examples, the powder may have an average particle size below mesh size 325 and may be formed by gas atomization.

In some examples, the braze alloy powder may include one or more high-melting point materials in addition to the Si-based alloy(s). For example, the braze alloy powder may include one or more components having a melting-point greater than about 1400 degrees Celsius in addition to the Si-based alloy. The addition of such high melting point components may increase the amount of stable phases, such as, e.g., SiC, in braze joint 22 formed from aqueous braze paste 12.

In some examples, the composition of the silicon-based powder may be selected based on the composition of first and second ceramic/CMC parts 14, 16. For example, a silicon-based braze powder may be used to join a silicon-based ceramic/CMC to another silicon-based ceramic/CMC.

Any suitable water-soluble polymer may be used to bind the braze alloy powder in aqueous braze paste 12. The water-soluble polymer may be added to water, which then may be mixed with the silicon-based braze alloy powder to form braze paste 12. Example binders include polyvinyl alcohol (PVA), polyvinylpyrrolidone (PVP), and polyvinylpyrrolidone/vinyl acetate (PVP/VA) copolymer. The water-soluble polymer may be chemically compatible with the composition of the first and second ceramic/CMC parts. For example, the polymer should not yield a large amount of carbonaceous residue when pyrolyzed in the absence of oxygen.

In some examples, the binder may function as an adhesive that can be used to fixture the first and second ceramic parts 14, 16 relative to each other in its pure aqueous solution and/or mixed with the braze alloy powder. For example, such an adhesive may be added at interface 24 between respective surfaces of first and second ceramic parts 14, 16 to bond the parts in a position that maintains joint 22 between the respective parts. If first and second ceramic/CMC parts 14, 16 are fixtured using the pure aqueous solution (e.g., a solution comprising, consisting or consisting essentially of water and the binder without the braze alloy powder), no new polymers may be introduced to assembly 10 or the brazing furnaces, which limits any possible contamination. If mixed braze paste (e.g., a paste comprising, consisting or consisting essentially of water, the binder, and the braze alloy powder) is used to fixture the joints, braze paste 12 can be placed in-situ while the joint 22 is fixtured, therefore limiting the distance that the braze alloy must flow into joint 22 to create a high integrity braze joint 26. As one example, polyvinyl alcohol may create a bond that is both quick-drying and strong enough to withstand jostling and minor impacts that assembly 10 may incur during moving, shipping, and/or placement into a brazing furnace.

Suitable amounts of braze alloy powder may be mixed with the aqueous binder solution of water-soluble polymeric binder and water to form braze paste 12 that exhibits the desired properties. In some examples, braze paste 12 may include between approximately 0.4 weight percent (wt %) and approximately 95 wt % water (e.g., between approximately 18 wt % and approximately 20 wt % water or between approximately 4.25 wt % and approximately 24 wt % water) and between approximately 0.03 wt % and approximately 20 wt % polymeric binder (e.g., between approximately 1.5 wt % and approximately 2 wt % polymeric binder or between approximately 0.25 wt % and approximately 4 wt % polymeric binder) with the balance of braze paste 12 comprising, consisting, or consisting essentially of the silicon-based alloy powder. In some examples, braze paste 12 may include more wt % water compared to the wt % of the polymeric binder. In some examples, braze paste 12 may include between approximately 0.5 wt % and approximately 99.50 wt % silicon-based alloy powder (e.g., between approximately 75 wt % and approximately 95 wt % silicon-based alloy powder). The formed paste 12 may have a viscosity that allows paste 12 to be deposited using a desired technique, e.g., via a syringe.

Figure 2:
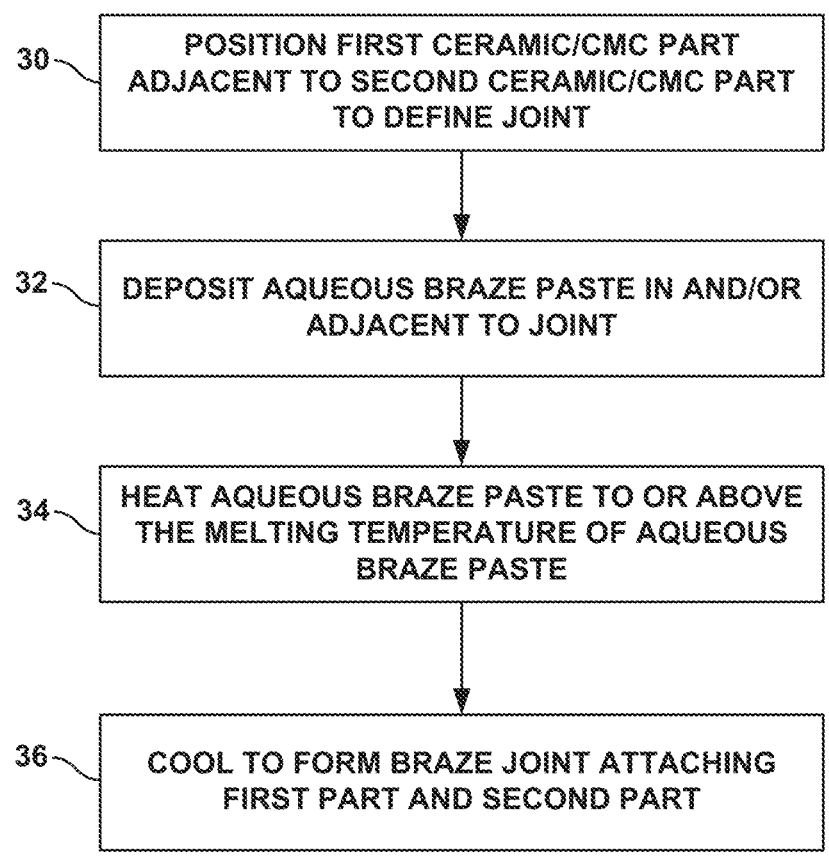
FIG. 2 is a flow diagram illustrating an example technique for forming a braze joint connecting two ceramic/CMC parts using an aqueous braze paste.

FIG. 2 is a flow diagram illustrating an example technique for joining first ceramic/CMC part 14 and a second ceramic/CMC part 16 using aqueous braze paste 12. The technique of FIG. 2 will be described with reference to assembly 10 as shown in FIGS. 1A and 1B for ease of description, although the technique may be used to form other assembly configurations including two or more ceramic/CMC parts connected to each other.

As shown in FIG. 2, first ceramic/CMC part 14 and second ceramic/CMC part 16 may be positioned adjacent to each other to define joint 22 between adjacent portions of the first ceramic/CMC part 14 and the second ceramic/CMC part 16 (30). Aqueous braze paste 12 may be deposited in the joint and/or adjacent joint 22, e.g., via a syringe as a cohesive bead or other suitable technique (32). In some examples, after a period of time following deposition, paste 12 may display a hard rubber-like consistency and may be well adhered to the surface of part 14 and/or part 16 to prevent paste 12 from being easily dislodged from the position at which paste 12 was deposited (30). Such adherence of paste 12 may be provided by the water-soluble alcohol based binder in paste 12 in examples in which the binder is selected to serve to some extent as an adhesive.

Following deposition of braze paste 12 (32), assembly 10 may be placed in a furnace for brazing by raising the temperature of braze paste 12 to or above the melting point of the braze powder (34). Depending on the composition of the braze powder in braze paste 22, the temperature during brazing may be, e.g., greater than about 1300 degrees Celsius. As noted above, in some examples, an adhesive may be applied at interface 24 to bond first part 14 and second part 16, e.g., in the desired position relative to each other to form joint 22. Such bonding may prevent the movement of first part 14 and second part 16 relative to each other, e.g., during transportation of assembly 10 to a furnace prior to brazing. When at or above the melting point, braze paste 12 may flow into at least a portion of joint 22 between first part 14 and second part 16, e.g., as shown in FIG. 1B. The assembly 10 may then be cooled to solidify the melted braze powder and form braze joint 22, including phases such as, titanium silicide, silicon, and ternary phases attaching first part 14 to second part 16 (36).

Figure 3:
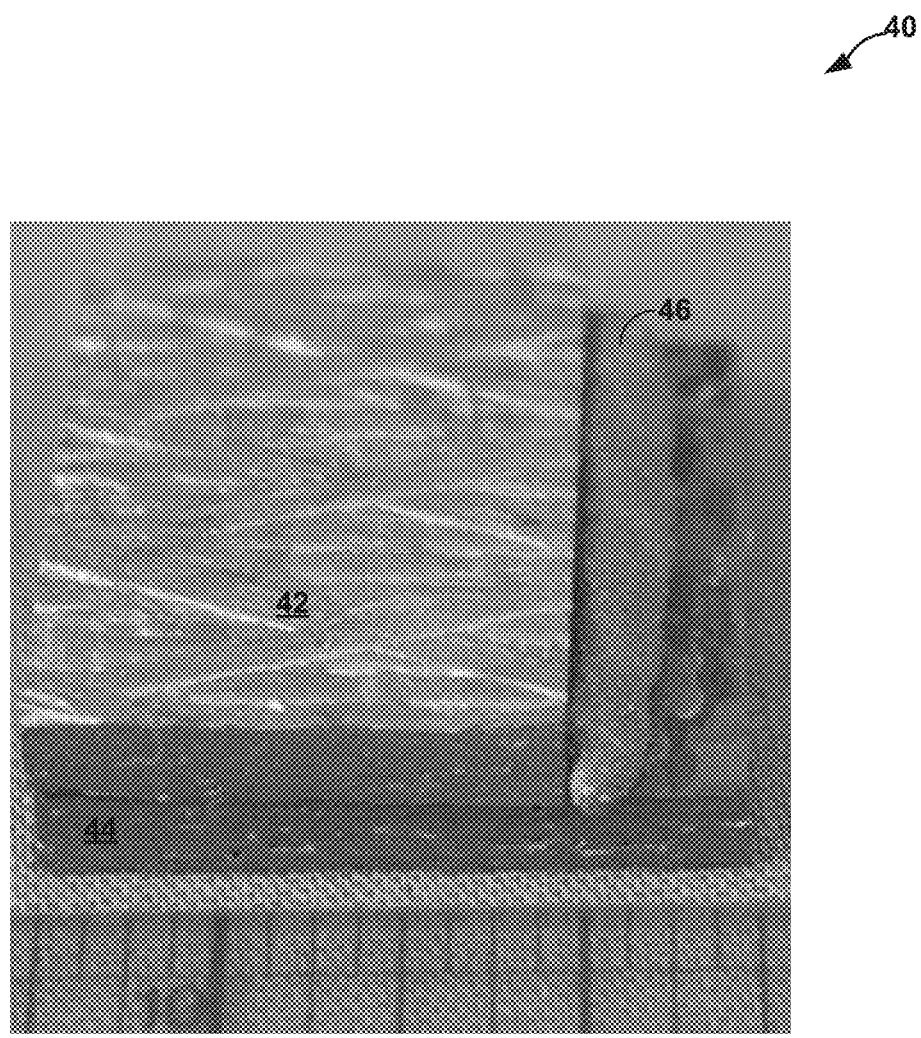
FIG. 3 is a photograph showing an example assembly formed in accordance with an example of the disclosure.

FIG. 3 is a photograph showing an example assembly in accordance with some examples of the disclosure. Assembly 40 included two SiC ceramic parts 42, 44 and an example aqueous braze paste 46. Braze paste 46 included about 18.4 wt % water, about 1.6 wt % polyvinyl alcohol, and the balance (about 80 wt %) a Si—Ti braze powder. Braze paste 46 was deposited adjacent a joint space formed between the respective SiC parts to provide the configuration shown in FIG. 3. Subsequently, assembly 40 was placed in a furnace to raise the temperature to above 1350 degrees Celsius to melt the braze powder. Assembly 40 was then cooled to solidify the braze point and form a braze joint connecting the respective SiC parts to each other. The finished assembly was found to have acceptable levels of porosity and no foreign material inclusions.

Various examples have been described. These and other examples are within the scope of the following claims.

What is claimed is:

1. A method comprising:
positioning a first ceramic or ceramic matrix composite (CMC) part and a second ceramic or CMC part adjacent to each other to define a joint between adjacent portions of the first ceramic or CMC part and the second ceramic or CMC part; and
depositing an aqueous braze paste at least one of in the joint or adjacent the joint, wherein the aqueous braze paste comprises water, a water-soluble polymeric binder, and a silicon-based alloy powder, wherein the aqueous braze paste includes a greater weight percent of the water than the water-soluble polymeric binder, wherein the water-soluble polymeric binder comprises at least one of polyvinyl alcohol (PVA), polyvinylpyrrolidone (PVP), or polyvinylpyrrolidone/vinyl acetate (PVP/VA) copolymer, and wherein the aqueous braze paste comprises between about 4.25 wt % and about 24 wt % of the water, and between about 0.25 wt % and about 4 wt % of the water-soluble polymeric binder.

2. The method of claim 1, wherein the silicon-based alloy powder comprises an alloying component, the alloying component comprising at least one of Ti, Co, C, Mo, B, V, Cr, Cu, Nb, or Zr.

3. The method of claim 1, wherein the aqueous braze paste comprises one or more additional components having a melting temperature greater than about 1400 degrees Celsius.

4. The method of claim 1, wherein positioning a first ceramic or CMC part and a second ceramic or CMC part adjacent to each other to define a joint between adjacent portions of the first ceramic or CMC part and the second ceramic or CMC part comprising fixturing the first ceramic or CMC part and the second ceramic or CMC part adjacent to each other via an adhesive.

5. The method of claim 4, wherein the adhesive comprises the aqueous braze paste or the water-soluble polymeric binder without the silicon-based alloy powder.

6. The method of claim 1, further comprising:
heating the aqueous braze paste to a temperature at which the aqueous braze paste flows in the joint; and
subsequently cooling the aqueous braze paste to form a braze joint attaching the first ceramic or CMC part and the second ceramic or CMC part adjacent to each other.

7. The method of claim 1, wherein positioning the first ceramic or CMC part and a second ceramic or CMC part adjacent to each other to define a joint between adjacent portions of the first ceramic or CMC part and the second ceramic or CMC part comprises forming at least one of a bridle joint, a butt joint, a miter join, a dado joint, a groove joint, a tongue and groove joint, a mortise and tenon joint, a birdsmouth joint, a halved joint, a biscuit joint, a lap joint, a double lap joint, a dovetail joint, or a spliced joint.

8. An aqueous braze paste comprising water, a water-soluble polymeric binder, and a silicon-based alloy powder, wherein the braze paste is configured to connect a first ceramic or ceramic matrix composite (CMC) part and a second ceramic or CMC part adjacent to each other via a braze joint between adjacent portions of the first ceramic or CMC part and the second ceramic or CMC part, wherein the aqueous braze paste includes a greater weight percent of the water than the water-soluble polymeric binder, wherein the water-soluble polymeric binder comprises at least one of polyvinyl alcohol (PVA), polyvinylpyrrolidone (PVP), or polyvinylpyrrolidone/vinyl acetate (PVP/VA) copolymer, and wherein the aqueous braze paste comprises between about 4.25 wt % and about 24 wt % of the water, and between about 0.25 wt % and about 4 wt % of the water-soluble polymeric binder.

9. The paste of claim 8, wherein the silicon-based alloy powder comprises an alloying component, the alloying component comprising at least one of Ti, Co, C, Mo, B, V, Cr, Cu, Nb, or Zr.

10. The paste of claim 8, further comprising one or more additional components having a melting temperature greater than about 1400 degrees Celsius.

11. An assembly comprising:
   a first ceramic or ceramic matrix composite (CMC) part;
   a second ceramic or CMC part adjacent to the first ceramic or ceramic matrix composite part, wherein the parts define a joint between adjacent portions of the first ceramic or CMC part and the second ceramic or CMC part; and
   an aqueous braze paste at least one of in the joint or adjacent the joint, wherein the aqueous braze paste comprises water, a water-soluble polymeric binder, and a silicon-based alloy powder, wherein the aqueous braze paste includes a greater weight percent of the water than the water-soluble polymeric binder, wherein the water-soluble polymeric binder comprises at least one of polyvinyl alcohol (PVA), polyvinylpyrrolidone (PVP), or polyvinylpyrrolidone/vinyl acetate (PVP/VA) copolymer, and wherein the aqueous braze paste comprises between about 4.25 wt % and about 24 wt % of the water, and between about 0.25 wt % and about 4 wt % of the water-soluble polymeric binder.

12. The assembly of claim 11, wherein the silicon-based alloy powder comprises an alloying component, the alloying component comprising at least one of Ti, Co, C, Mo, B, V, Cr, Cu, Nb, or Zr.

13. The method of claim 1, wherein the aqueous braze paste comprises between about 18 wt % and about 24 wt % of the water.

14. The method of claim 1, wherein the aqueous braze paste comprises between about 0.25 wt % and about 2 wt % of the water-soluble polymeric binder.

15. The method of claim 1, wherein the water-soluble polymeric binder comprises at least one of the polyvinylpyrrolidone (PVP), or the polyvinylpyrrolidone/vinyl acetate (PVP/VA) copolymer.

16. The paste of claim 8, wherein the aqueous braze paste comprises between about 18 wt % and about 24 wt % of the water.

17. The paste of claim 8, wherein the aqueous braze paste comprises between about 0.25 wt % and about 2 wt % of the water-soluble polymeric binder.

18. The paste of claim 8, wherein the water-soluble polymeric binder comprises at least one of the polyvinylpyrrolidone (PVP), or the polyvinylpyrrolidone/vinyl acetate (PVP/VA) copolymer.

19. The assembly of claim 11, wherein the aqueous braze paste comprises between about 18 wt % and about 24 wt % of the water.

20. The assembly of claim 11, wherein the aqueous braze paste comprises between about 0.25 wt % and about 2 wt % of the water-soluble polymeric binder.

* * * * *